(12) United States Patent
Hashimoto et al.

(10) Patent No.: US 7,225,144 B2
(45) Date of Patent: May 29, 2007

(54) SERVER DEVICE AND RECORDING MEDIUM FOR SAME

(75) Inventors: Ichiro Hashimoto, Kanazawa (JP); Koji Nozawa, Kanazawa (JP); Yasuko Yamauchi, Kanazawa (JP)

(73) Assignee: Fujitsu Limited, Kawasaki (JP)

( * ) Notice: Subject to any disclaimer, the term of this patent is extended or adjusted under 35 U.S.C. 154(b) by 326 days.

(21) Appl. No.: 09/761,780

(22) Filed: Jan. 18, 2001

(65) Prior Publication Data

US 2002/0007326 A1    Jan. 17, 2002

(30) Foreign Application Priority Data

Jul. 12, 2000    (JP)    ............................. 2000-211650

(51) Int. Cl.
*G06G 1/14*    (2006.01)
(52) U.S. Cl. .................... 705/22; 709/219; 709/217
(58) Field of Classification Search ................ 705/22, 705/28, 29, 26; 709/219
See application file for complete search history.

(56) References Cited

U.S. PATENT DOCUMENTS

| | | | | |
|---|---|---|---|---|
| 4,797,818 | A * | 1/1989 | Cotter | 705/15 |
| 4,992,940 | A * | 2/1991 | Dworkin | 705/26 |
| 5,842,178 | A * | 11/1998 | Giovannoli | 705/26 |
| 6,070,160 | A * | 5/2000 | Geary | 707/4 |
| 6,282,517 | B1 * | 8/2001 | Wolfe et al. | 705/26 |
| 6,401,076 | B1 * | 6/2002 | Hall et al. | 705/22 |
| 6,748,426 | B1 * | 6/2004 | Shaffer et al. | 709/219 |
| 6,965,868 | B1 * | 11/2005 | Bednarek | 705/9 |
| 2001/0047303 | A1 * | 11/2001 | Greenstone | 705/22 |
| 2002/0007321 | A1 * | 1/2002 | Burton | 705/26 |
| 2002/0019699 | A1 * | 2/2002 | McCarty et al. | 701/211 |
| 2002/0032613 | A1 * | 3/2002 | Buettgenbach et al. | 705/26 |
| 2002/0038261 | A1 * | 3/2002 | Kargman et al. | 705/26 |
| 2002/0055878 | A1 * | 5/2002 | Burton et al. | 705/26 |
| 2002/0072984 | A1 * | 6/2002 | Rothman et al. | 705/26 |
| 2002/0087505 | A1 * | 7/2002 | Smith et al. | 707/1 |
| 2002/0087522 | A1 * | 7/2002 | MacGregor et al. | 707/3 |
| 2002/0147663 | A1 * | 10/2002 | Walker et al. | 705/26 |

FOREIGN PATENT DOCUMENTS

| | | |
|---|---|---|
| JP | 8-329143 | 12/1996 |
| JP | 10-091711 | 4/1998 |
| WO | WO 0108071 | * 2/2001 |

OTHER PUBLICATIONS

"ServiceMerchandise.com Rolls Out Store Picp-up, Store Return Features; Click, Call or Come By Options Make Shopping Easy," Nov. 29, 1999, Business Wire (file 20: 08448412).*

* cited by examiner

*Primary Examiner*—Andrew Joseph Rudy
*Assistant Examiner*—Vanel Frenel
(74) *Attorney, Agent, or Firm*—Staas & Halsey LLP

(57) ABSTRACT

A network-based server device for managing product inventory information on an individual-store basis, the server device including a receiving unit receiving requests for product information from a client device, and a processing unit transmitting, to the client device in response to the request for product information, product inventory information on an individual-store basis corresponding to stores selected on the basis of client or customer identification information.

11 Claims, 17 Drawing Sheets

FIG.3A

MEMBER REGISTRATION SCREEN — 310

320 { LAST NAME: [ ]   FIRST NAME: [ ]

PLEASE CHECK THE BOX NEXT TO THE DESIGNATED ADDRESS

330 {
- [ ] HOME
  - 335 { POSTAL CODE: [ ]
  - ADDRESS: [ ]
  - TEL.NO.: [ ]
- [X] WORK
  - POSTAL CODE: [ ]
  - ADDRESS: [ ]
  - TEL.NO.: [ ]

340 {
- [X] CREDIT CARD NO. [ ]
- [ ] BANK ACCOUNT [ ]

350 — [REGISTRATION]   [CANCEL] — 360

FIG.3B

ITEM DATABASE

| ISBN | TITLE | AUTHOR | PUBLISHER | DATE OF ISSUE | PRICE |
|---|---|---|---|---|---|
| xxxx-xxxx-xxxx | A LOST PARADISE | WATANABE JUNICHI | KODANSHA | APRIL 1999 | ¥2,000 |
| yyyy-yyyy-yyyy | OUTLINE OF PATENT LAW 12th EDITION | YOSHIFUJI KOSAKU | YUHIKAKU | DECEMBER 1998 | ¥8,000 |
| ... | ... | ... | ... | ... | ... |

FIG.3C

INVENTORY DATABASE

STORE A

| ISBN | NO. IN STOCK |
|---|---|
| xxxx-xxxx-xxxx | 10 |
| . . . | . . . |

STORE B

| ISBN | NO. IN STOCK |
|---|---|
| zzzz-zzzz-zzzz | 2 |
| . . . | . . . |

FIG.3D

STORE DATABASE

| STORE NAME | ZIP CODE | ADDRESS | TEL.NO. | HOURS | MAP INFORMATION | LATITUDE AND LONGITUDE |
|---|---|---|---|---|---|---|
| "A" BOOKSTORE | 100-0019 | KAWASAKI-SHI, S-KU ○○ 1-2-3 | 044-222-3333 | 10:00AM–9:00PM CLOSED MONDAYS | bookstore_a.bmp | xx.xx xx.xx |
| "X" BOOKSTORE | 180-0023 | TOKYO, MINATO-KU ○×2-2-2 | 03-3333-1111 | 10:00AM–2:00AM OPEN YEAR-ROUND | bookstore_x.bmp | xx.xx xx.xx |
| ... | ... | ... | ... | ... | ... | ... |

FIG.4

TITLE SEARCH

INPUT SEARCH TERMS

| AUTHOR ▽ | WATANABE JUNICHI | and ▽ |
| TITLE ▽ | | and ▽ |
| PUBLISHER ▽ | | |

420  430  440

DISPLAY NUMBER [ 10 ▽ ] ~450

460~ SEARCH   CLEAR ~470

FIG.5

SEARCH RESULTS SCREEN

| | TITLE | AUTHOR | PUBLISHER | DATE OF ISSUE | PRICE |
|---|---|---|---|---|---|
| 1 | 風のように・贅を尽くす | WATANABE JUNICHI | KODANSHA | APRIL 1999 | ¥2,000 |
| 2 | 失楽園 A LOST PARADISE | WATANABE JUNICHI | KODANSHA | APRIL 1999 | ¥2,000 |
| 3 | 失楽園 下 | WATANABE JUNICHI | KODANSHA | APRIL 1999 | ¥2,000 |
| 4 | 失楽園 上 | WATANABE JUNICHI | KODANSHA | APRIL 1999 | ¥2,000 |
| 5 | 風のように・不況にきく薬 | WATANABE JUNICHI | KODANSHA | APRIL 1999 | ¥2,000 |
| 6 | 風のように・贅を尽くす | WATANABE JUNICHI | KODANSHA | APRIL 1999 | ¥2,000 |
| 7 | 失楽園 A LOST PARADISE | WATANABE JUNICHI | KODANSHA | APRIL 1999 | ¥2,000 |
| 8 | 失楽園 下 | WATANABE JUNICHI | KODANSHA | APRIL 1999 | ¥2,000 |
| 9 | 失楽園 上 | WATANABE JUNICHI | KODANSHA | APRIL 1999 | ¥2,000 |
| 10 | 風のように・不況にきく薬 | WATANABE JUNICHI | KODANSHA | APRIL 1999 | ¥2,000 |

FIG.6

INVENTORY INFORMATION SCREEN

TITLE ××××

| PLACE HOLD | NAME OF STORE (620) | ACCESS (630) | STORE HOURS (640) | INVENTORY (650) |
|---|---|---|---|---|
| ☐ | A STORE | KAWASAKI-SHI,S-KU○○1-2-3<br>Phone:044-222-3333 | 10:00AM-9:00PM<br>CLOSED MONDAYS | 5 |
| ☐ | B STORE | KAWASAKI-SHI,X-KU××○3-2-1<br>Phone:044-111-1111 | 10:00AM-10:00PM<br>OPEN YEAR ROUND | 10 |
| ☐ | C STORE | YOKOHAMA-SHI,T-KU××5-2-1<br>Phone:045-222-2222 | 9:00AM-8:00PM<br>CLOSED TUESDAYS | 0 |
| ☐ | D STORE | KAWASAKI-SHI,Z-KU△○3-5-4<br>Phone:044-333-1111 | 9:30AM-8:30PM<br>CLOSED WEDNESDAYS | 3 |
| ☐ | E STORE | KAWASAKI-SHI,Y-KU○×2-5-14<br>Phone:044-111-1212 | 9:00AM-9:00PM<br>CLOSED THE FIRST WEDNESDAY OF EVERY MONTH | 20 |

TITLE ×××××

| PLACE HOLD | NAME OF STORE | ACCESS | STORE HOURS | INVENTORY |
|---|---|---|---|---|
| ☐ | A STORE | KAWASAKI-SHI,S-KU○○1-2-3<br>Phone:044-222-3333 | 10:00AM-9:00PM<br>CLOSED MONDAYS | 5 |
| ☐ | B STORE | KAWASAKI-SHI,X-KU××○3-2-1<br>Phone:044-111-1111 | 10:00AM-10:00PM<br>OPEN YEAR ROUND | 10 |
| ☐ | C STORE | YOKOHAMA-SHI,T-KU××5-2-1<br>Phone:045-222-2222 | 9:00AM-8:00PM<br>CLOSED TUESDAYS | 0 |
| ☐ | D STORE | KAWASAKI-SHI,Z-KU△○3-5-4<br>Phone:044-333-1111 | 9:30AM-8:30PM<br>CLOSED WEDNESDAYS | 3 |
| ☐ | E STORE | KAWASAKI-SHI,Y-KU○×2-5-14<br>Phone:044-111-1212 | 9:00AM-9:00PM<br>CLOSED THE FIRST WEDNESDAY<br>OF EVERY MONTH | 20 |

VARIATION (SORT) OF INVENTORY DISPLAY

TITLE ×××××

| PLACE HOLD | STORE NAME | CONTACT INFORMATION | STORE HOURS | INVENTORY |
|---|---|---|---|---|
| ☐ | B STORE | KAWASAKI-SHI,X-KU×○3-2-1<br>Phone:044-111-1111 | 10:00AM-10:00PM<br>OPEN YEAR ROUND | 10 |
| ☐ | E STORE | KAWASAKI-SHI,Y-KU○×2-5-14<br>Phone:044-111-1212 | 9:00AM-9:00PM<br>CLOSED THE FIRST WEDNESDAY OF EVERY MONTH | 20 |
| ☐ | A STORE | KAWASAKI-SHI,S-KU○○1-2-3<br>Phone:044-222-3333 | 10:00AM-9:00PM<br>CLOSED MONDAYS | 5 |
| ☐ | D STORE | KAWASAKI-SHI,Z-KU△○3-5-4<br>Phone:044-333-1111 | 9:30AM-8:30PM<br>CLOSED WEDNESDAYS | 3 |
| ☐ | C STORE | YOKOHAMA-SHI,T-KU××5-2-1<br>Phone:045-222-2222 | 9:00AM-8:00PM<br>CLOSED TUESDAYS | 0 |

WEB SERVER OPERATIONS FLOW CHART

| CITY | NEAREST LOCATION | NEAREST LOCATION | NEAREST LOCATION |
|---|---|---|---|
| KAWASAKI | YOKOHAMA-SHI,T-KU | YOKOHAMA-SHI,M-KU | |
| YOKOHAMA | KAWASAKI-SHI,Z-KU | KAWASAKI-SHI,Y-KU | KAWASAKI-SHI,S-KU |
| ... | ... | ... | ... |

FIG.12

CONTENTS OF A SHOPPING CART

| LIST OF BOOKS IN THE CART | RECALCULATE | OK | BACK |
|---|---|---|---|

*UNCHECK BOOKS YOU DO NOT WANT.
*YOU CAN REVISE THE NUMBER OF COPIES YOU WANT TO ORDER.
*ONCE YOU HAVE REVISED THE QUANTITY, PRESS THE "RECALCULATE" BUTTON. THE TOTAL SUM WILL BE RECALCULATED.
*WHEN YOUR ORDER IS COMPLETE PRESS THE "OK" BUTTON.
*TO RETURN TO THE LIST SCREEN, PRESS THE "BACK" BUTTON.

| | TITLE | METHOD OF PICK-UP | HOLD PLACED AT STORE | METHOD OF PAYMENT | PRICE | QUANTITY | TOTAL |
|---|---|---|---|---|---|---|---|
| ☑ | A LOST PARADISE-I WATANABE JUNICHI KODANSHA | STORE HOLD ▽ | STORE ▽ | BANK DEBIT ▽ | ¥1,904 | 1 | ¥1,904 |
| ☑ | A LOST PARADISE-II WATANABE JUNICHI KODANSHA | STORE HOLD ▽ | STORE ▽ | BANK DEBIT | ¥1,904 | 2 | ¥3,808 |
| | | | | POSTAL MONEY ORDER | | | |
| | | | | CREDIT CARD | CONSUMPTION TAX | | ¥288 |
| | | | | | DELIVERY CHARGE | | ¥350 |
| | | | | | HANDLING FEE | | ¥300 |
| | | | | | TOTAL | 3 | ¥6,350 |

SERVER DEVICE AND RECORDING MEDIUM FOR SAME

BACKGROUND OF THE INVENTION

1. Field of the Invention

The present invention relates generally to a server device and recording medium for same, and more particularly, to a server device and recording medium that searches for product information via a network such as the internet and displays inventory information about that product.

2. Description of Related Art

Japanese Laid-Open Patent Application No. 8-329143 teaches a system in which an order for an item, such as a book or a compact disk (CD), is received from a customer via the internet, the item is shipped to a bookstore designated by the customer, and the customer then goes to the designated bookstore to pick up the ordered item. For the convenience of the customer, this system provides means for searching for the item and displays item inventory information on a web site as a result of that search.

Additionally, there is Japanese Laid-Open Patent Application No. 10-91711. The technology disclosed herein similarly involves expressing in graphic form an inventory of a particular item at a particular store and displaying that graphic at a client's device.

However, the inventory information displayed by the above-described prior art is inventory information about the item in question for one particular store (the intermediate or agent store), not inventory information about the item for every store that carries the item.

In other words, a disadvantage of the conventional art is that it affords no way for the customer to know the state of the inventory at stores where the customer might be willing and able to go to pick up the ordered item. Accordingly, despite the fact that the ordered item might be in stock at (for example) a store nearest the customer, because the customer has placed the order with the agent store he must wait for the agent store to ship the item to the designated store. This waiting is unnecessary and inefficient.

Additionally, a so-called shopping cart model for making shopping on the internet efficient is known. However, a disadvantage of the conventional art is that a single method of taking delivery and a single method of payment is specified for all the items in the basket. Accordingly, the conventional shopping cart model does not allow customers to use different methods of taking delivery and different methods of payment for individual items in the cart.

SUMMARY OF THE INVENTION

Accordingly, it is a general object of the present invention to provide an improved and useful server device and recording medium for same, in which the above-described disadvantages are eliminated.

Another object of the present invention is to provide an improved and useful server device and recording medium for same that provides inventory information about the item for each store that carries the item.

Another object of the present invention is to provide an improved and useful server device and recording medium for same that provides item inventory information for stores nearest the customer's given address.

Another object of the present invention is to provide an improved and useful server device and recording medium for same that provides inventory information for every store in a form that is convenient for the customer.

Another and further object of the present invention is to provide an improved and useful shopping cart model that allows the customer to specify different methods of payment and/or different methods of taking delivery for each item of a plurality of items in a shopping cart.

The above-described objects of the present invention are achieved by a network-based server device for managing product inventory information on an individual-store basis, the server device including a receiving unit receiving requests for product information from a client device; and a processing unit transmitting, to the client device in response to the request for product information, product inventory information on an individual-store basis corresponding to stores selected on the basis of client or customer identification information.

Additionally, the above-described objects of the present invention are also achieved by a computer-readable recording medium containing a program for a network-based server device adapted to employing a shopping cart model, the recording medium comprising:

a management unit that manages information on a plurality of items put into a shopping cart by the customer; and a processing unit that transmits to a client device a menu that allows the customer to select from among a plurality of methods of taking delivery and a plurality of methods of payment for each item in the shopping cart in response to a request from the client device to display contents of the shopping cart.

Additionally, the above-described objects of the present invention are also achieved by a network-based client device that searches product information from a server device, the client device comprising:

a requesting unit that requests product inventory information of the server device;

a receiving unit that receives the product inventory information on an individual-store basis from the server device; and a display unit for displaying the inventory information on an individual-store basis for stores selected on the basis of client or customer identification information.

According to these aspects of the invention, an improved and useful service can be provided to the customer.

Other objects, features and advantages of the present invention will become more apparent from the following detailed description when read in conjunction with the accompanying drawings.

BRIEF DESCRIPTION OF THE DRAWINGS

FIGS. 3A, 3B, 3C and 3D are diagrams showing a member registration screen, an item database screen, an inventory database screen and a store database screen, respectively;

FIG. 4 is a diagram showing a sample book title search screen;

FIG. 5 is a diagram showing a sample search results screen;

FIG. 6 is a diagram showing a sample inventory information screen;

FIG. 7A is a diagram showing a second sample inventory information screen;

FIG. 7B is a diagram showing a third sample inventory information screen;

FIG. 12 is a diagram showing sample contents of a shopping cartridge;

DETAILED DESCRIPTION OF THE PREFERRED EMBODIMENTS

A description will now be given of embodiments of the present invention, with reference to the accompanying drawings. It should be noted that identical or corresponding elements in the embodiments are given identical or corresponding reference numbers in all drawings, with detailed descriptions of such elements given once and thereafter omitted.

The term "item" used in this specification means tangible property that can be transported by one means or another, and includes but is not limited to things that can be transported by hand such as books, CDs, digital versatile disks (DVDs), video tapes, everyday-use articles and sundries, as well as things transportable by vehicle, such as television sets, stereos, computers, furniture, and so forth. For purposes of illustrative convenience only, the following description uses books as the item ordered.

Additionally, the term "access information" used in this specification means information for the purpose of accessing a store, and specifically means the store address, telephone number, area map and home page or URL, either singly or in combination.

Additionally, though the following description uses the term "internet", in actuality the present invention can be adapted to a wide range of network services.

Figure 1:
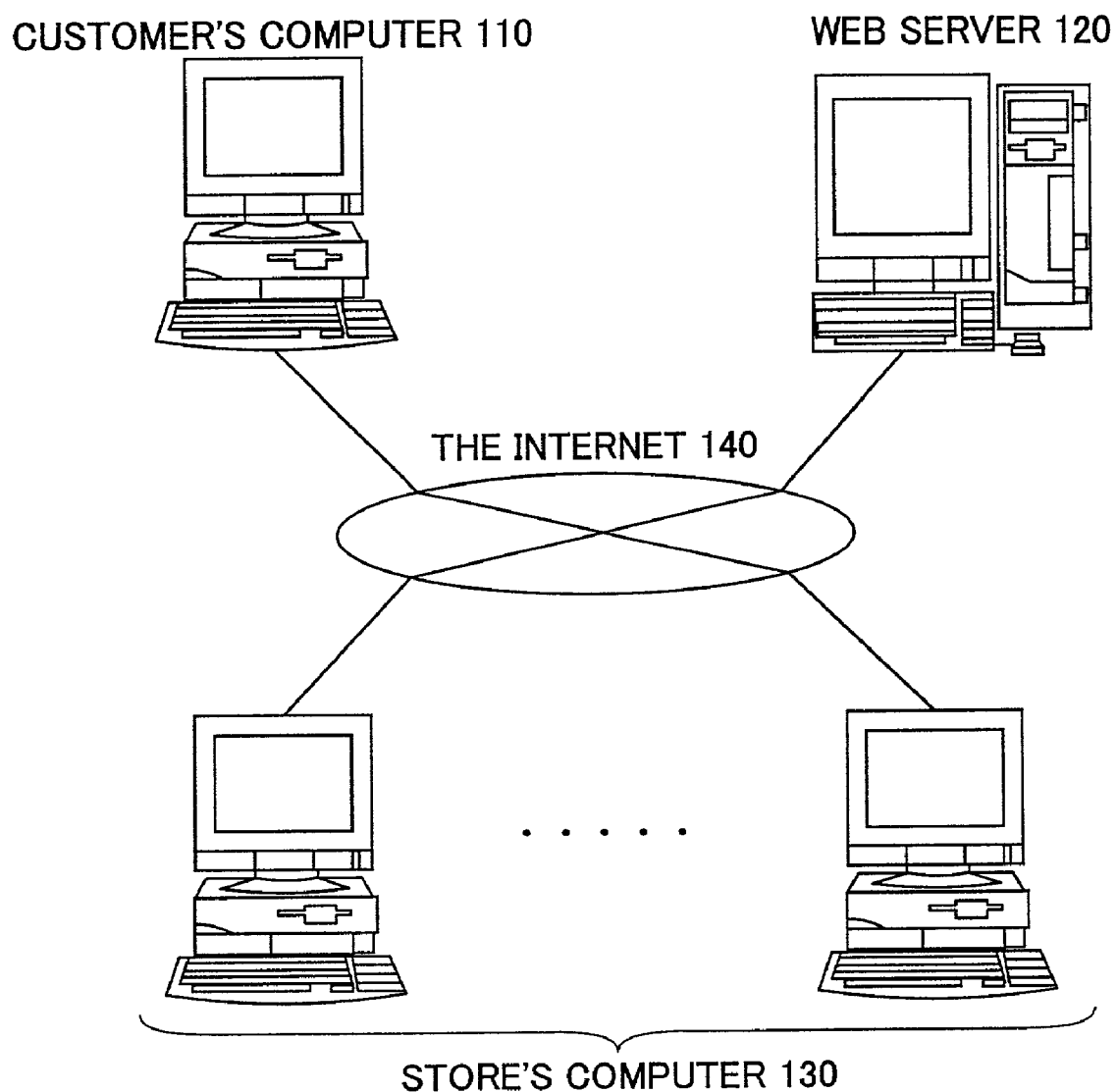
FIG. 1 is a diagram of the system composition of the present invention.

FIG. 1 is a diagram of the system composition of the present invention. Using a computer 110 the customer connects to the internet, and accesses a variety of web sites using an internet browser. The web server 120 provides a web site (hereinafter also called a merchant web site) for ordering items over the internet. At the provided web site the customer can search item information and obtain inventory information about the items searched.

A plurality of store computers 130 are installed at a plurality of stores and update item inventory information in an inventory database of the web server 120 via the internet 140. The plurality of stores may be branch stores of a corporation that operates the web server 120 and thus within the same enterprise or they may be different enterprises, in which case the corporation and the enterprise are in a contractual relationship. The updating of the inventory information may be performed either in real time or by batch processing overnight.

Figure 2:
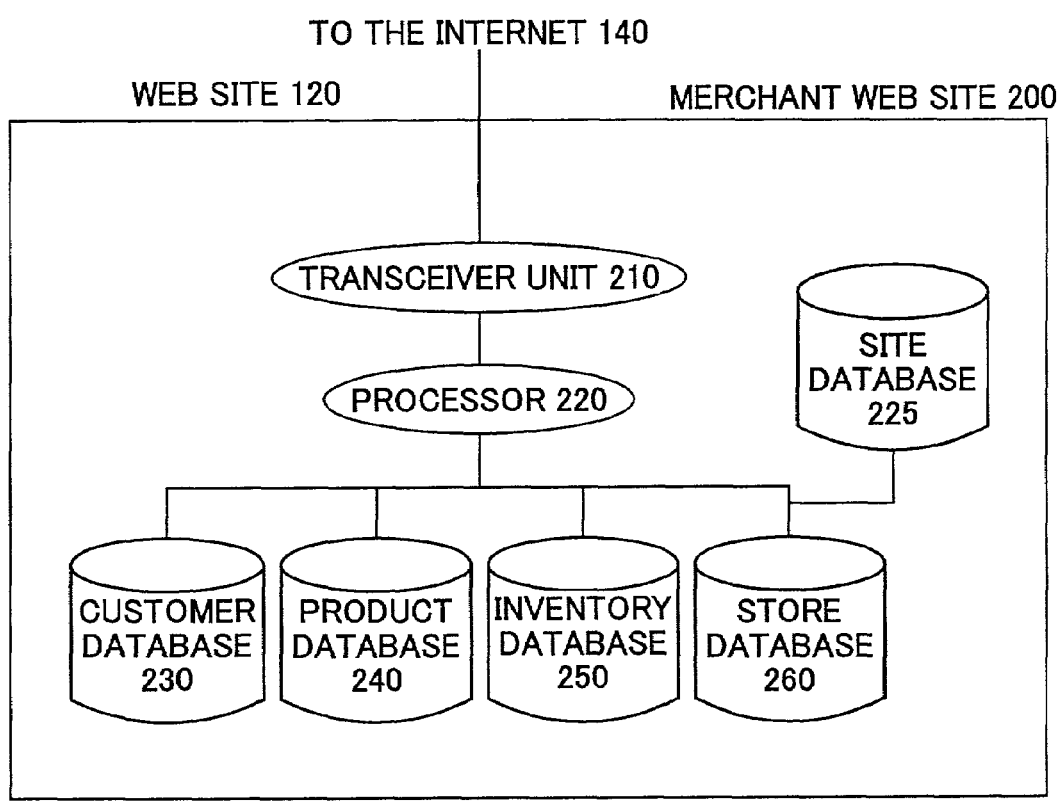
FIG. 2 is a diagram of the composition of a merchant web site.

FIG. 2 is a diagram of the composition of a merchant web site, and shows the composition of the web server 120. A transceiver unit 210 receives orders from customer computers 110 and inventory information from store computers 130 and transmits processed results from the processor 220. The processor 220 is loaded by a common gate interface program (cgi program). The processor 220 provides sample pattern pages written in HTML (Hyper Text Markup Language) to be provided at the merchant web site (see FIGS. 3 through 7) and carries out a variety of processes using a variety of databases based on the customer's search request. For convenience of explanation a description of these processes will be deferred.

The major databases that the processor 220 chiefly accesses is a site database 225 that manages the HTML pages, a customer database 230 that provides customer information, an item database 240 that manages item information, an inventory database 250 that manages inventory information for each store with respect to the items in the item database 240, and a store database 260 that manages information for each store. It should be noted that the site database 225 manages the sample pattern HTML pages shown in FIGS. 3 through 7.

FIG. 3 is a diagram of a screen used for member registration provided by the web server 120. The information to be registered includes name 320, contact information 330 and method of payment information 340. When the customer clicks the register button the above-described information is sent to the web server 120. The web server 120 then issues a member ID to the customer and records the member ID together with the registration information in the customer database 230. It should be noted that the member ID can be converted into information that identifies a client device, information that for example is managed by a cookie. Additionally, it should be noted that the contact information 330 is composed of respective home and work postal codes, home address, telephone number and a so-called "designated address". By clicking a check box 335 the customer can select either the home or work address as the designated address. (In FIG. 3A, the work address is checked.) The "designated address" is the address of a place that is convenient for the customer to go to retrieve an ordered item, and either a home address, a business address or some other address (not shown in the diagram) can be selected. The customer can also change the selected designated address.

The method of payment 340 is composed of either a credit card number or a bank account or both. The method of payment 340 may be left blank if the user does not wish to provide the information. Here, too, by clicking the check box the customer can designate a "preferred method of payment". In FIG. 3A, payment by credit card is selected as the preferred method of payment. The customer can also change the preferred method of payment, as will be explained later with reference to FIG. 12.

FIG. 3B shows the contents of the item database 240. The item database 240 is composed of an ISBN (an item ID), a title (title of the book), author's name, publisher and price. The contents of the database change depending on the item to be handled.

FIG. 3C shows the contents of the inventory database 250. A file is provided for each individual store, with each file containing information by ISBN and number of books in stock. Updating the inventory database can be done either in real time or by batch processing.

FIG. 3D shows the contents of the store database 260. The store database is composed of the name of the store, access information (postal code, address, telephone number and area map), store hours of operation and the latitude and longitude of the location of the store.

FIG. 4 is a diagram showing a sample book title search screen 410 which is displayed on the customer computer 110. The search object 420 designates the search terms to be used in searching the item database (author, title and publisher). The search terms 30 designate the search words. The logic conditions 440 specify the logic connectors (AND, OR). The display number 450 designates the number of search results to be displayed on one page. When the search button 460 is clicked, the designated conditions are sent to the web server 120 and the processor 220 searches the item database 240. In FIG. 4, the customer is searching for books authored by Watanabe Jun'ichi.

FIG. 5 is a diagram showing a sample search results screen displayed at the customer's computer 110. The results shown in FIG. 5 are based on the search conducted using the search terms designated in FIG. 4. The lines drawn under the titles indicate a hyperlink, that URL (not shown in the diagram) being a link to a merchant web site and including a corresponding ISBN (item ID). Accordingly, when the customer clicks on the hyperlink a request for more detailed information is generated and the ISBN of the clicked title is transmitted to the web server 120 as a result.

FIG. 6 is a diagram showing a sample inventory information screen displayed at the customer's computer 110. As a result of the request for details (shown in FIG. 5), the screen shows inventory information for stores located near the customer's designated address. The processes from FIG. 5 through FIG. 6 will be explained later, with reference to FIG. 8. By checking the check box 610, the customer can place a hold on the item at that bookstore. (A "hold" is a promise to purchase the item, so the bookstore holds the book until the customer comes to pick it up several days later.)

The names of the stores (620) are underlined, showing a hyperlink to the store access information such that, for example, a file of an area map of the store's location can be displayed on the internet browser. Other access information includes the store address and/or telephone number, which is already shown in FIG. 6. Such access information is useful to the customer when the customer goes to pick up the ordered item at the store. Additionally, though not shown in the diagram, other access information can include use of a URL to a web site providing an area map address and telephone number for the store in question.

Additionally, the screen in FIG. 6 includes store operating hours for each store. Such store hour information is useful to the customer when the customer goes to pick up the ordered item at the bookstore. Further, the screen shown in FIG. 6 shows the inventory 650 at each store of the item ordered, that is, the number of copies of the ordered book in stock at each store location. Such store information is managed by the store database 260 described above.

In the example shown in FIG. 6, the information is sorted by store and displayed in order of store A, store B, store C and so forth. It should be noted that the screen shown in FIG. 6 can be configured to eliminate one or more of the check box 610, the access information (such as the hyperlink and the contact information 630) and the store hours 640. However, at least the store name 620 and the inventory (number of items in stock) 650 are required.

FIG. 7A shows a second sample inventory information screen. The distinctive feature of this sample inventory information screen is that it is possible to distinguish between the stores in order of proximity to the customer's designated address by the addition of the mark 710. In this case, designating the store having the mark 710 makes pick-up more convenient for the customer. Other aspects of the screen are the same as those shown in FIG. 6, so a detailed description thereof will be omitted.

FIG. 7B shows a third sample inventory information screen. The distinctive feature of this screen is the sorting of stores in order of proximity to the customer's designated address. In this case, designating the first store listed makes pick-up more convenient for the customer. Other aspects of the screen are the same as those shown in FIG. 6, so a detailed description thereof will be omitted.

Figure 8:
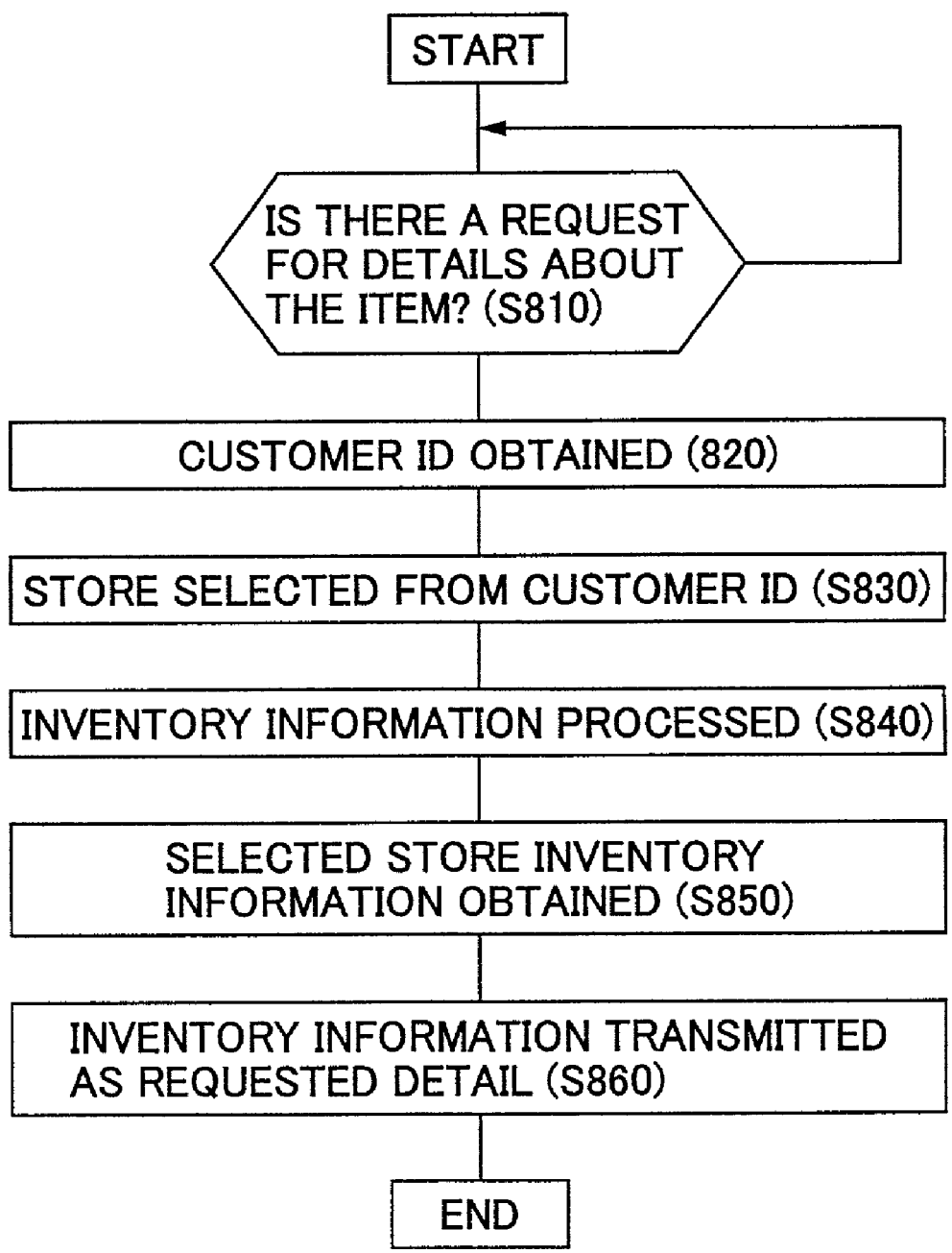
FIG. 8 is a web server operations flow chart.

FIG. 8 is a web server operations flow chart, showing how the web server 120 operates when receiving a request for details about an item from a customer computer 110, in other words the operation of the server shown in FIGS. 5, 6, 7A and 7B.

In a step S810, the processor 220 determines whether or not a request for details about an item has been received by the transceiver unit 210. Such a request may, for example, be generated by clicking on the book title hyperlink shown in FIG. 5 as described above, which causes the customer's Internet browser to transmit the relevant URL. Such a URL, as described above, includes the item ID of the relevant item.

In a step S820, the processor obtains client identification information managed by the client device cookie.

In a step S830, the processor 220 accesses the customer database 230 and obtains the customer's designated address from the client identification information. If the customer has not yet registered as a member then the process jumps to the membership registration screen shown in FIG. 3.

In a step S840, the processor 220 accesses the store database 260 and, using the relevant designated address information, selects the stores nearest the designated address and obtains information about the stores (such as access information 630, store hours 640, and so forth). Thereafter, the processor 220 attaches marks 710 to the stores nearest the designated address and sorts the selected store information according to proximity to the designated address. This process of tagging and sorting the store information will be explained later with reference to FIGS. 9, 10 and 11.

In a step S850, the processor 220, using the item ID selected from the URL, accesses the inventory database 250 and obtains inventory information about the relevant item at the selected stores.

In a step S860, the processor 220 puts the selected store information and inventory information in table form, attaches place hold check boxes 610 as appropriate, and sends the assembled information to the customer computer 110.

As described above, the screens shown in FIGS. 6, 7A and 7B are displayed at the customer's computer 110.

It should be noted that, in place of the step S820, it is possible to have the customer input identifying information (such as member ID and password) at the top page of the web site and then allow the item search to be conducted once the customer ID information has been verified.

Figures 9, 10:
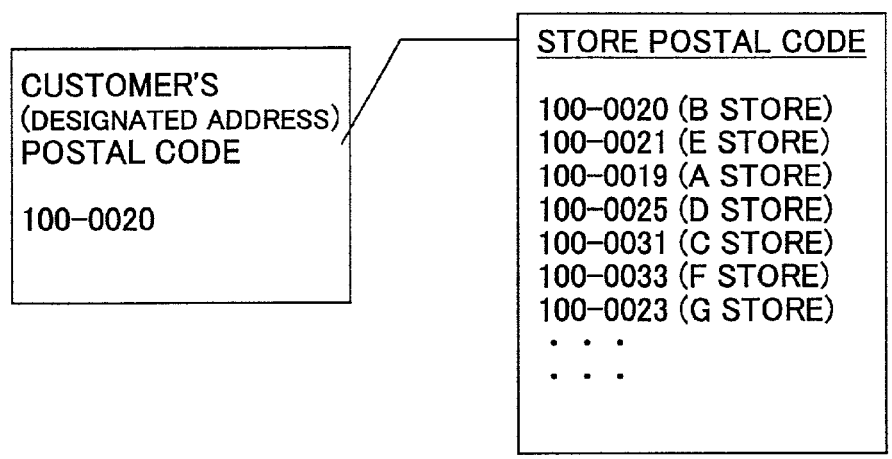
FIG. 9 is a diagram showing a first store information selection and processing method.
FIG. 10 is a diagram showing a second store information selection and processing method.
Figure 11:
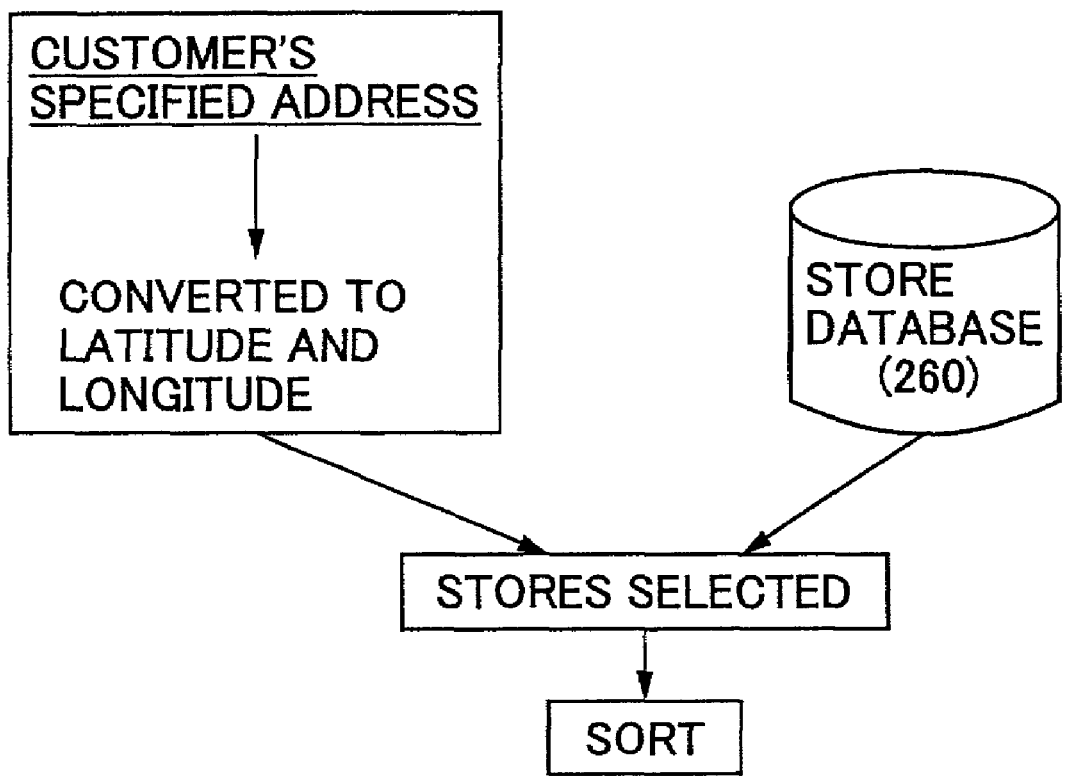
FIG. 11 is a diagram showing a third store information selection and processing method.

FIGS. 9, 10 and 11 are diagrams showing methods of selecting store information from the appropriate database based on the customer's designated address. Specifically, FIG. 9 is a diagram showing a first store information selection and processing method. FIG. 10 is a diagram showing a second store information selection and processing method. FIG. 11 is a diagram showing a third store information selection and processing method.

In FIG. 9, the customer's designated address is the postal code thereof (see FIG. 3). In this case, the designated address information selected in step S830 is the designated address postal code 100-0020. The processor 220 then selects stores having a postal code within a certain range of the customer's postal code 100-0020 from the store database.

The first three digits of the postal code indicate the city and the last four digits of the postal code indicate the ward within the city. Accordingly, two stores having the same first three digits in their postal codes are located in the same city, and two stores sharing the same 7-digit postal code are located within the same ward in the city.

Accordingly, the area of store selection is based on the customer's postal code, and specifically, a match of the store postal code and the customer code, in order of resort, of (1) all seven digits (indicating the store lies within the same ward of the same city), (2) of the first three digits of the postal code (indicating the store lies within the same city), and (3) stores within a certain range of the first three digits of the customer's postal code.

The right side of FIG. 9 shows the postal codes of the stores selected according to the hierarchy described above. When, as in this case, several stores satisfy criterion (2) described above, the processor 220 then determines that those stores with postal codes whose final four digits differ least from the final four digits of the customer's postal code are stores that are nearest the customer's designated address. Accordingly, the processor 220 can select by approximation those stores that are nearest the designated address.

When the inventory information screen shown in FIG. 6 is transmitted, the processor 220 sorts the store names in the step S840. When the inventory display screen shown in FIG. 7B is transmitted, the processor 220 sorts the information by postal code using the criteria described above. (The right side of FIG. 9 shows a display sorted according to these criteria.) When transmitting the inventory information screen shown in FIG. 7A, the processor 220 further sorts the information by attaching the mark 710 described above to the first three entries.

It should be noted that although the foregoing description uses postal codes in order to explain the operation of the present invention, in actuality a special area code of one's own making or an existing area code can be used in place of the postal codes.

FIG. 10, in which the city portion of the address designated by the customer is used, is a table that defines the customer's designated address and a proximal relation thereto, and is stored in the site database 225. According to the diagram, in this case wards T and M of the city of Yokohama are designated as nearest locations to the city of Kawasaki.

In this case, the processor 220 selects the city and ward information of the customer's designated address and refers to the table shown in FIG. 10. The city and ward information of the designated address selected in step S830 is "Kawasaki-shi, Nakahara-ku". The processor 220 first accesses the store database 260 and searches for stores having "Kawasaki-shi, Nakahara-ku" as the store address. Next, the processor 220 then refers to the table in FIG. 10, searches for locations defined as locations nearest to Kawasaki, and obtains "Yokohama-shi, T-ku" and "Yokohama-shi, Mku" as a result. In this manner, by a process of approximation the processor 220 can select information about stores near the designated address.

When the inventory information screen shown in FIG. 6 is transmitted, the processor 220 sorts the stores in a step S840. When transmitting the inventory display screen shown in FIG. 7B, the processor 220 sorts the data in order of proximity to the customer's designated location using the criteria described above. When transmitting the inventory information screen shown in FIG. 7A, the processor 220 further sorts the information by attaching the mark 710 described above to the first three entries.

As noted above, FIG. 11 is a diagram showing a third store information selection and processing method. In FIG. 11, the entire designated address has been converted into latitude and longitude information and used as the customer's designated address. The processor 220 accesses the customer database 230 and obtains the entire designated address. The processor 220 transfers the designated address to a GPS (Global Positioning System) and receives latitude and longitude converted by the GPS. The processor 220 then accesses the store database 260 and selects a store or stores having latitude and longitude near the latitude and longitude of the customer's designated address. According to this method, it is possible to accurately select a store near the customer's designated address.

When transmitting the inventory information screen shown in FIG. 6, the processor sorts the stores in the step S840.

When transmitting the inventory display screen shown in FIG. 7B, the processor 220 sorts the data in order of proximity to the customer's designated address using the above-described criteria. When transmitting the inventory information screen shown in FIG. 7A, the processor 220 further sorts the information by attaching the mark 710 described above to the three entries shown.

In this example, the customer has designated store B as the store at which a hold is to be placed on the item ordered. In the inventory information display screens shown in FIGS. 6, 7A and 7B, clicking the button 660 transfers the designated contents (that is, item ID and designated store information) to a shopping cart module. By repeating this process the customer can put a plurality of items into his own shopping cart.

The customer can display the contents of the shopping cart on the computer 110 internet browser by making a request of the web server 120.

FIG. 12 is a diagram showing sample contents of a shopping cart. The distinctive feature of this shopping cart is that the customer can designate different methods of pick-up and different methods of payment for individual items in the shopping cart.

The default for the "method of payment" is the method of payment specified and set by the customer when registering as a member (see FIG. 3). FIG. 12 shows a bank account number as the method of payment because the customer designated a bank account as the preferred method of payment at registration. The customer can easily change this method of payment simply by choosing either "C.O.D." or "credit card" from a drop down list.

Additionally, as described above, information about the store designated to hold the item ordered in FIG. 6 is also transferred to the shopping cart module, so in FIG. 12 the "delivery method" is given as a store hold at store B. However, the method of taking delivery and/or the store at which the ordered item is to be picked up can be changed for each individual item. Other possible pick-up alternatives include, for example, "home delivery", which, when selected, places the customer's designated address in the "hold placed at store" column.

Figure 13:
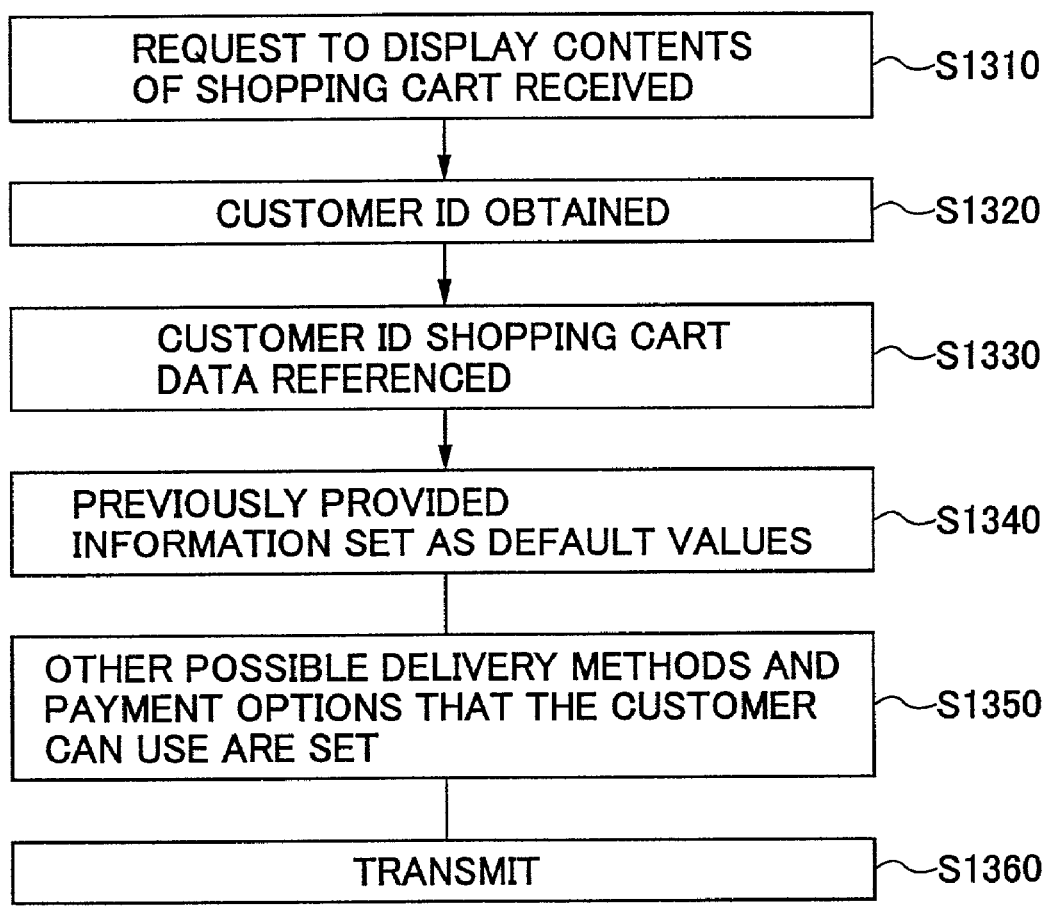
FIG. 13 is a web server operations flow chart.

FIG. 13 is a web server operations flow chart, showing the operation of the web server 120 when there is a request to display the contents of the shopping cart. As a result of such a request, the screen shown in FIG. 12 is displayed on the internet browser.

In a step S1310, the transceiver unit 210 receives from the customer computer 110 a request to display the contents of the shopping cart and relays same to the processor 220.

In a step S1320, the processor 220 obtains the customer ID. As described above, this client identification information may be obtained from the cookie, or it may be obtained using the member ID input by the customer.

In a step S1330, the processor 220 references the shopping cart data using the customer ID. The shopping cart data comprises, at least with respect to the customer ID, item ID and individual product ID, a pre-selected method of taking delivery and store hold as well as a pre-selected method of payment (if there is one).

In a step S1340, if there is a preselected method of taking delivery, store hold and method of payment, then the processor 220 sets these selections as the defaults. In this case, this customer has already specified a method of taking delivery (at the store), the store at which a hold is placed on the item ordered (store B) (FIG. 6). Additionally, the processor 220 refers to the customer database 230, obtains a method of payment designated by such customer as a preferred method of payment (for example "bank account"; see FIG. 3), and sets this customer designation as the default selection.

In a step S1350, the processor 220 sets other possible methods of taking delivery and payment options that the customer can use for each item ID. As described above, the other delivery options are "home delivery" and the other payment options are "credit card" and "C.O.D.".

In a step S1360, the processor 220 arranges these items in tabular form and transfers them to the transceiver 210. The transceiver 210 then transmits the processing results to the customer's computer 110. A screen like that shown in FIG. 12 is then displayed at the customer's internet browser.

On the screen shown in FIG. 12, the customer, as described above, can freely change both method of payment and method of taking delivery for each individual item in the cart. Then, by clicking the OK button within the cart, the contents set as shown at the screen in FIG. 12 are transmitted to the web sever 120.

The processor 220 then checks the method of payment in the customer database 230 against the method of payment specified at the screen shown in FIG. 12 to determine if they match. If, for example, at the screen shown in FIG. 12 the customer chooses to designate "credit card" as the method of payment when there is no credit card information contained in the customer database 230 for this customer, then the processor 220 determines that there is no match and instead transmits a form to the customer for the purpose of inputting the customer's credit card information.

If, on the other hand, "bank account" is designated as the method of payment at the screen shown in FIG. 12 and a check of the customer database 230 reveals that bank account information for this customer does exist in the customer database, then the processor 220 determines that there is a match and writes an order to an order database not shown in the diagram. With the writing of the order to the order database the ordering process is completed.

It should be noted that although the above description assumes that the data for the items in the customer's shopping cart (at least including the item ID and the amount) are managed on the server side, it is also possible to manage this data on the client side. In that case, when a request is made to display the contents of the shopping cart, the customer computer 110 transmits this data to the web server 120. The processor 220 references the item database and obtains the information (such as book title, price and author) needed for the display shown in FIG. 12.

Being able to specify different methods of payment for each item in the shopping cart as described above is convenient for the customer when purchasing both expensive and inexpensive items at the same time. In other words, the customer can choose to pay for expensive items (such as, for example, an encyclopedia) by credit card and at the same time pay for inexpensive items (such as, for example, paperback novels) by cash.

Additionally, being able to specify different methods of taking delivery for each item in the shopping cart as described above is convenient for the customer when purchasing both easy-to-carry and bulky items at the same time. In other words, the customer can choose to pick up easy-to-carry items (such as paperback novels) at the nearest store and can arrange for home delivery of bulky items (such as a 20-volume set of encyclopedias)

Figure 14:
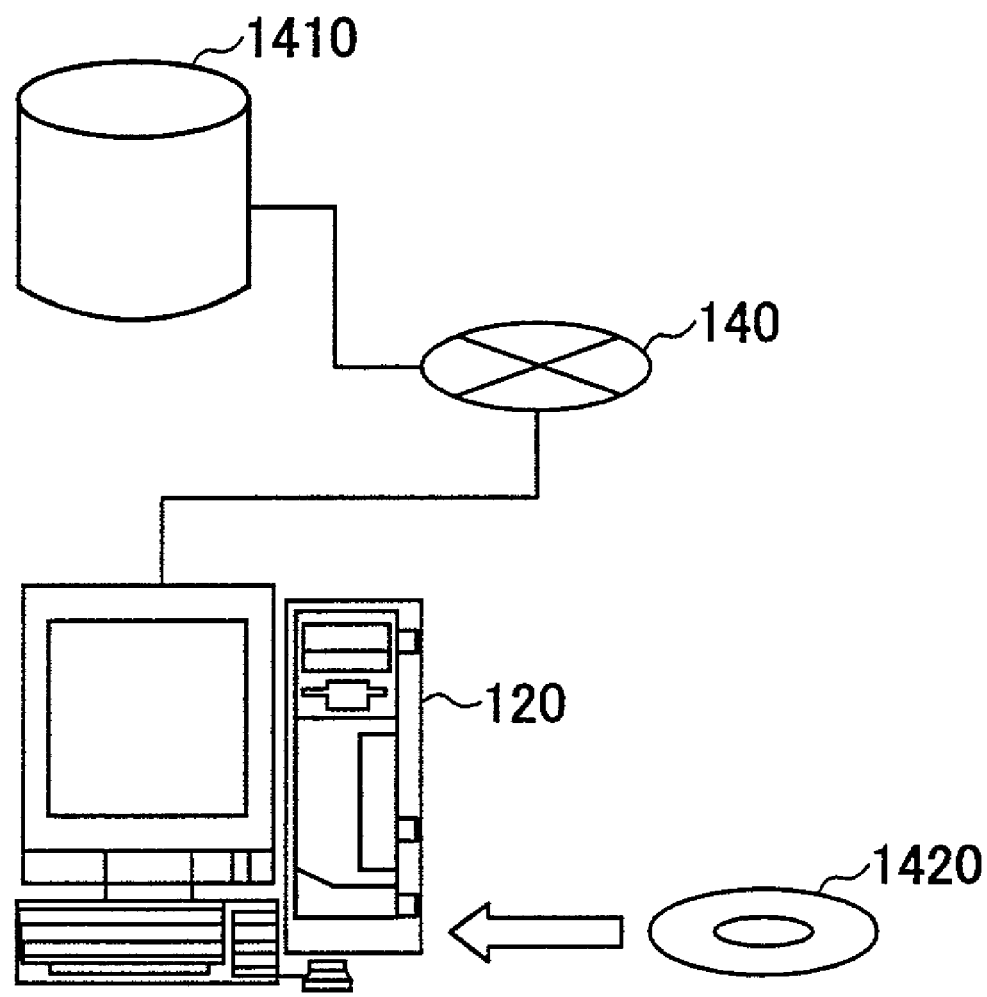
FIG. 14 shows a method for distributing a recording medium on which the present invention is stored.

FIG. 14 is a diagram illustrating a distribution method of the processor 220 (cgi program), and shows a method for distributing a recording medium on which the present invention is stored.

Reference numeral 1410 represents a recording medium (a hard disk) for storing the cgi program 220. The hard disk 1410 stores the cgi program 220 and can provide same to the web server 120 via a network such as the internet 140. The web server 120 downloads the cgi program 220 and loads it into the memory unit for execution. The execution is as described above.

Additionally, the cgi program 220 can also be stored on a portable recording medium 1420 such as, for example, a CD-ROM, a DVD, an MO, and so on. The cgi program can then be distributed in the market via the portable recording medium 1420. The purchaser can then execute the program by loading the recording medium 1420 into the memory. The execution is as described above.

It should be noted that the web server 120 can be located in a country other than the country in which the computer 110 is located. In other words, the web server 120 can provide the above-described service worldwide from within Japan. Accordingly, in this case, a computer used by a resident of the United States can become the customer computer 110 and can receive the above-described service.

The above description is provided in order to enable any person skilled in the art to make and use the invention and sets forth the best mode contemplated by the inventors of carrying out the invention.

The present invention is not limited to the specifically disclosed embodiments, and variations and modifications may be made without departing from the scope and spirit of the present invention.

The present application is based on Japanese Priority Application No. 2000-211650, filed on Jul. 12, 2000, the contents of which are hereby incorporated by reference.

What is claimed is:

1. A network-based server device for managing product inventory information on an individual-store basis, comprising:
    a receiving unit receiving requests for product information from a customer via a respective client device; and
    a process unit identifying inventory information of stores having an address which is in proximity to an address designated by the customer, and transmitting, to the client device in response to the request for product information, the identified product inventory information on an individual-store basis corresponding to respective stores selected on the basis of customer identification information received from the respective client device,
    wherein each store's proximity to the designated address is determined by the processing unit by a first checking for an exact zip code match between the respective stores and the designated address, a second checking for a match of first n digits of the designated address zip code and the respective stores if there was not an exact zip code match, and a third checking for stores having a zip code within a range of the first n digits of the designated address zip code if there was not the exact zip code match and the first n digits of the zip codes did not match.

2. The network-based server device as claimed in claim 1, wherein the transmitted product inventory information comprises access information for accessing individual stores.

3. The network-based server device as claimed in claim 1, wherein the transmitted product inventory information comprises hours of operation information for individual stores.

4. The network-based server device as claimed in claim 1, wherein the processing unit sorts the transmitted product inventory information by store in order of proximity to the address designated by the customer.

5. The network-based server device as claimed in claim 1, wherein the processing unit adds identifying marks to the transmitted product inventory information so as to identify stores nearest the address designated by the customer.

6. The network-based server device as claimed in claim 1, wherein the server device adds to the store-based inventory information transmitted to the client device a screen that allows the customer to place a hold on an item.

7. A computer-readable recording medium containing a program for a server device that manages product inventory information on an individual-store basis, the program comprises:
   a receiving unit receiving requests for product information from a customer via a respective client device; and
   a processing unit identifying inventory information of stores having an address which is in proximity to an address designated in customer identification information by the customer, and transmitting, to the client device in response to the request for product information, the identified product inventory information on an individual-store basis corresponding to respective stores selected on the basis of customer identification information received from the respective client device,
   wherein each store's proximity to the designated address is determined by the processing unit by a first checking for an exact zip code match between the respective stores and the designated address, a second checking for a match of first n digits of the designated address zip code and the respective plurality of stores if there was not an exact zip code match, and a third checking for stores having a zip code within a range of the first n digits of the designated address zip code if there was not the exact zip code match and the first n digits of the zip codes did not match.

8. The program as in claim 7, wherein the processing unit sends a signal to the client device requiring the customer to provide identification information to the receiving unit prior to transmitting product inventory information to the client device.

9. The program as in claim 8, wherein the processing unit interfaces with a plurality of databases to obtain the product inventory information corresponding to individual stores based on the received identification information.

10. A network based store product information inventory interface system, comprising:
    a client device to transmit item queries from a customer and to a display results corresponding to the item queries;
    a network based product information inventory interface, comprising:
        a transceiver to receive the item queries from the client device and to transmit the results corresponding to the item queries to the client device; and
        a processor, causing the transceiver to send a registration form to the client device, for the customer to enter client identification information thereon, including a designated address, and to return the completed registration form, when the processor does not recognize a registered customer, and retrieving a designated address when the processor recognizes a registered customer,
    wherein the processor selects and sorts a plurality of stores from a database of stores based on each store which is in proximity to the designated address, and the processor obtains product inventory information corresponding to the item queries for each selected store and causes the transceiver to transmit the results to the client device, and the customer in response to the displayed results selects items for the respective store to hold for the customer, and each store's proximity to the designated address is determined by the processor by a first checking for an exact zip code match between the respective plurality of stores and the designated address, a second checking for a match of first n digits of the designated address zip code and the respective plurality of stores if there was not an exact zip code match, and a third checking for stores having a zip code within a range of the first n digits of the designated address zip codes if there was not the exact zip code match and the first n digits of the zip codes did not match.

11. A process, comprising:
    receiving requests for product information from a customer via a respective client device; and
    identifying inventory information of stores having an address which is in proximity to an address designated by the customer, and transmitting, to the client device in response to the request for product information, the identified product inventory information on an individual-store basis corresponding to respective stores selected on the basis of customer identification information received from the respective client device, where each store's proximity to the designated address is determined by comparing for an exact zip code match between the respective stores and the designated address, a partial match of first n digits of the designated address zip code and the respective stores, and a range match of stores having a zip code within a range of the first n digits of the designated address zip code in order until a match occurs.

* * * * *

UNITED STATES PATENT AND TRADEMARK OFFICE
CERTIFICATE OF CORRECTION

PATENT NO. : 7,225,144 B2
APPLICATION NO. : 09/761780
DATED : May 29, 2007
INVENTOR(S) : Ichiro Hashimoto et al.

It is certified that error appears in the above-identified patent and that said Letters Patent is hereby corrected as shown below:

Column 10, Line 55, change "process" to --processing--.

Column 11, Line 28-29, change "comprises:" to --comprising:--.

Column 12, Line 4, after "and to" delete "a".

Column 12, Line 36, after "address zip" change "codes" to --code--.

Signed and Sealed this

Ninth Day of October, 2007

JON W. DUDAS
*Director of the United States Patent and Trademark Office*